United States Patent
Kayama et al.

(10) Patent No.: US 7,661,892 B2
(45) Date of Patent: Feb. 16, 2010

(54) IMAGE-CAPTURING DEVICE, LIGHT ADJUSTMENT MECHANISM, AND LIGHT CONTROL BLADE

(75) Inventors: Shun Kayama, Saitama (JP); Yukiko Shimizu, Saitama (JP); Atsushi Takano, Kanagawa (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 11/254,766

(22) Filed: Oct. 21, 2005

(65) Prior Publication Data

US 2006/0088312 A1    Apr. 27, 2006

(30) Foreign Application Priority Data

Oct. 26, 2004    (JP) .............................. 2004-310445

(51) Int. Cl.
 *G03B 9/40* (2006.01)
(52) U.S. Cl. ................... 396/488; 396/490; 396/509
(58) Field of Classification Search ................ 396/490, 396/494, 452, 471, 493
See application file for complete search history.

(56) References Cited

U.S. PATENT DOCUMENTS

| | | | | |
|---|---|---|---|---|
| 3,681,474 A | * | 8/1972 | Lombardi et al. | 525/71 |
| 3,867,203 A | * | 2/1975 | Gesing et al. | 438/10 |
| 4,047,212 A | * | 9/1977 | Yamada | 396/505 |
| 6,269,226 B1 | * | 7/2001 | Aoshima | 396/458 |
| 6,550,987 B2 | * | 4/2003 | Ogawa | 396/488 |
| 6,805,500 B2 | * | 10/2004 | Miyazaki | 396/484 |
| 6,818,287 B1 | * | 11/2004 | Ogawa et al. | 428/292.1 |
| 6,924,941 B2 | * | 8/2005 | Okada et al. | 359/698 |
| 6,935,793 B2 | * | 8/2005 | Sakurai et al. | 396/488 |
| 6,984,078 B2 | * | 1/2006 | Inoue et al. | 396/510 |

(Continued)

FOREIGN PATENT DOCUMENTS

EP       867524 A1 * 9/1998

(Continued)

OTHER PUBLICATIONS

Japanese Office Action dated Mar. 4, 2008 for corresponding Japanese Application No. 2004-310445.

(Continued)

*Primary Examiner*—Melissa Jan Koval
*Assistant Examiner*—Linda B Smith
(74) *Attorney, Agent, or Firm*—Rader, Fishman & Grauer PLLC

(57) ABSTRACT

An image-capturing device includes a lens barrel having therein an optical image-capturing system; a light control blade which opens and closes an optical path of the optical image-capturing system so as to control the amount of light entering the system; and a base body having a transmission hole through which the optical path extends and supporting the light control blade in a movable manner. The light control blade includes a multilayer laminate including a base material composed of a film and serving as a substrate, and at least a metallic layer disposed on the base material; and a light-blocking layer disposed on a first section of the multilayer laminate. A second section of the multilayer laminate not having the light-blocking layer disposed thereon defines a light adjustment filter for adjusting the amount of incident light. The first section having the light-blocking layer defines a light-blocking portion for blocking incident light.

14 Claims, 12 Drawing Sheets

U.S. PATENT DOCUMENTS

| | | | |
|---|---|---|---|
| 7,053,514 B2 * | 5/2006 | Kayama et al. | 310/156.26 |
| 7,074,292 B2 * | 7/2006 | Ishigaki et al. | 156/244.19 |
| 7,473,042 B2 * | 1/2009 | Kawaguchi | 396/450 |
| 2003/0161626 A1 * | 8/2003 | Namazue et al. | 396/505 |
| 2003/0174196 A1 * | 9/2003 | Yashima et al. | 347/105 |
| 2004/0021758 A1 * | 2/2004 | Miyazaki et al. | 347/106 |

FOREIGN PATENT DOCUMENTS

| | | |
|---|---|---|
| JP | 51-090821 | 8/1976 |
| JP | 01-252945 A | 10/1989 |
| JP | 07-104343 | 4/1995 |
| JP | 07-281249 | 10/1995 |
| JP | 11-190866 | 7/1999 |
| JP | 11-202319 A | 7/1999 |
| JP | 2001-356386 | 12/2001 |
| JP | 2002-219778 A | 8/2002 |
| JP | 2004-020711 | 1/2004 |
| JP | 2004-037548 | 2/2004 |
| JP | 2004-117718 | 4/2004 |

OTHER PUBLICATIONS

Japanese Office Action dated May 22, 2008 for application No. JP 2004-310445.

* cited by examiner

IMAGE-CAPTURING DEVICE, LIGHT ADJUSTMENT MECHANISM, AND LIGHT CONTROL BLADE

CROSS REFERENCES TO RELATED APPLICATIONS

The present invention contains subject matter related to Japanese Patent Application JP 2004-310445 filed in the Japanese Patent Office on Oct. 26, 2004, the entire contents of which are incorporated herein by reference.

BACKGROUND OF THE INVENTION

1. Field of the Invention

The present invention relates to image-capturing devices, light adjustment mechanisms, and light control blades. In particular, the present invention relates to a light control blade that is integrally provided with a light adjustment filter so as to achieve lower manufacturing costs.

2. Description of the Related Art

A typical image-capturing device, such as a video camera and a still camera, is equipped with a light adjustment iris and a lens-shifting mechanism for shifting each lens in the optical-axis direction in order to perform focus control or zoom control. In a typical image-capturing device, the optical path of an optical image-capturing system is opened and closed by shifting a light control blade (i.e., a diaphragm blade) within a plane extending perpendicular to an optical axis of the optical system in order to adjust the amount of incident light. Specifically, the light control blade is included in the light adjustment iris and is shifted in response to a driving force of a driving motor.

In such an image-capturing device, if the amount of light from a photographic subject is too large, it may be necessary to control the amount of light entering an image-capturing unit, such as a CCD (charge coupled device). Generally, in addition to the iris mentioned above, the amount of incident light is also adjusted through a light adjustment filter, known as an ND (neutral density) filter.

In related art, a light control blade includes a light-blocking portion defining a main body of the blade, and a light adjustment filter attached to the main body of the blade by, for example, bonding such that the light adjustment filter covers a cutout portion provided in the main body. The cutout portion is used for the light adjustment. The light adjustment filter and the main body of the blade are shifted integrally so that a light adjustment function of the light control blade is achieved. An example of such a light control blade is disclosed in Japanese Unexamined Patent Application Publication No. 2001-356386.

SUMMARY OF THE INVENTION

However, according to the light control blade of the related art mentioned above, the light adjustment filter is fabricated separately from the main body of the blade and is attached to the main body of the blade by, for example, bonding. This implies that the light control blade has an excessive number of components and also requires the bonding process, and it is thus problematic in that it leads to an excessive number of steps in the manufacturing process and to high manufacturing costs.

Accordingly, there is a need for reducing the number of components in order to lower the manufacturing costs.

According to an embodiment of the present invention, there is provided an image-capturing device. The image-capturing device includes a lens barrel having an optical image-capturing system disposed inside thereof; a light control blade which opens and closes an optical path of the optical image-capturing system so as to control the amount of light entering the optical image-capturing system; and a base body having a transmission hole through which the optical path of the optical image-capturing system extends and supporting the light control blade in a movable manner. The light control blade includes a multilayer laminate including a base material which is composed of a film and serves as a substrate, and at least a metallic layer disposed on the base material, and a light-blocking layer disposed on a first section of the multilayer laminate. A second section of the multilayer laminate not having the light-blocking layer disposed thereon defines a light adjustment filter for adjusting the amount of incident light. The first section of the multilayer laminate having the light-blocking layer defines a light-blocking portion for blocking incident light.

Furthermore, according to an embodiment of the present invention, there is provided a light adjustment mechanism. The light adjustment mechanism includes a light control blade which opens and closes an optical path of an optical image-capturing system so as to control the amount of light entering the optical image-capturing system, and a base body having a transmission hole through which the optical path of the optical image-capturing system extends and supporting the light control blade in a movable manner. The light control blade includes a multilayer laminate including a base material which is composed of a film and serves as a substrate, and at least a metallic layer disposed on the base material, and a light-blocking layer disposed on a first section of the multilayer laminate. The second section of the multilayer laminate not having the light-blocking layer disposed thereon defines a light adjustment filter for adjusting the amount of incident light. The first section of the multilayer laminate having the light-blocking layer defines a light-blocking portion for blocking incident light.

Furthermore, according to an embodiment of the present invention, there is provided a light control blade which opens and closes an optical path of an optical image-capturing system so as to control the amount of light entering the optical image-capturing system. The light control blade includes a multilayer laminate including a base material which is composed of a film and serves as a substrate, and at least a metallic layer disposed on the base material; and a light-blocking layer disposed on a first section of the multilayer laminate. A second section of the multilayer laminate not having the light-blocking layer disposed thereon defines a light adjustment filter for adjusting the amount of incident light. The first section of the multilayer laminate having the light-blocking layer defines a light-blocking portion for blocking incident light.

Furthermore, according to an embodiment of the present invention, there is provided a method for manufacturing a light control blade. The method includes the steps of forming layers on opposite surfaces of a base material composed of a tape-like film so as to form a workpiece; partially masking the workpiece; coating the workpiece with a carbon layer by using a coating solution; and punching out a portion of the workpiece into a predetermined shape by pressing so as to form the light control blade. A first section of the light control blade having the carbon layer formed thereon serves as a light-blocking portion, and a second section of the light control blade not having the carbon layer formed thereon serves as a light adjustment filter.

Consequently, in the image-capturing device, the light adjustment mechanism, and the light control blade according to the embodiments of the present invention, the light adjustment filter and the light-blocking portion defining the main body of the blade are integrated with each other.

The image-capturing device according to the embodiment of the present invention is advantageous in that the light-blocking portion and the light adjustment filter are integrally included in the light control blade. Thus, the image-capturing device is given a lesser number of components and does not require a process for attaching the light adjustment filter to the light-blocking portion. Accordingly, this contributes to a lesser number of steps in the manufacturing process and also achieves lower manufacturing costs.

The light adjustment mechanism according to the embodiment of the present invention is advantageous in that the light-blocking portion and the light adjustment filter are integrally included in the light control blade. Thus, the light adjustment mechanism is given a lesser number of components and does not require a process for attaching the light adjustment filter to the light-blocking portion. Accordingly, this contributes to a lesser number of steps in the manufacturing process and also achieves lower manufacturing costs.

The light control blade according to the embodiment of the present invention is advantageous in having the light-blocking portion and the light adjustment filter integrated with each other. Thus, the light control blade is given a lesser number of components and does not require a process for attaching the light adjustment filter to the light-blocking portion. Accordingly, this contributes to a lesser number of steps in the manufacturing process and also achieves lower manufacturing costs.

DESCRIPTION OF THE PREFERRED EMBODIMENTS

An image-capturing device, a light adjustment mechanism, and light control blades according to preferred embodiments of the present invention will be described below with reference to the drawings. In the embodiments below, the image-capturing device is directed to a video camera, the light adjustment mechanism is directed to a light adjustment filter provided in a video camera, and the light control blades are directed to light control blades used in a video camera. The technical scope of the present invention is not limited to video cameras or elements equipped in video cameras, and may include, for example, still cameras, various types of image-capturing devices having functions for taking moving pictures or still images, and various types of light adjustment mechanisms and light control blades provided in image-capturing devices.

Figure 1:
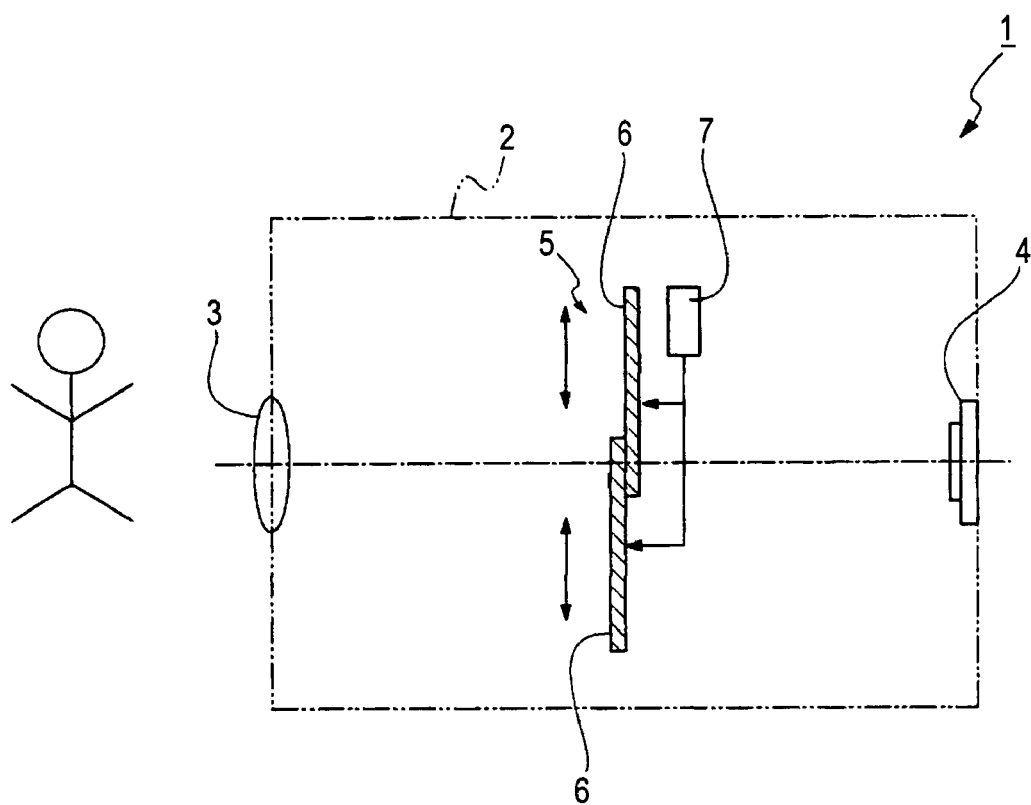
FIG. 1 is a schematic diagram showing the basic structure of an image-capturing device according to an embodiment of the present invention.

Referring to FIG. 1, the basic structure of an image-capturing device 1 defined by a video camera will be described.

The image-capturing device 1 includes a lens barrel 2, which functions as a casing and contains required components therein. Specifically, the lens barrel 2 is provided with a lens or a lens unit 3; an image-capturing unit 4, which may be, for example, a solid-state image sensor; and a light adjustment mechanism 5 having a function for adjusting the amount of incident light. The lens or the lens unit 3 is simply illustrated as a single lens in FIG. 1.

A pair of light control blades 6, 6 included in the light adjustment mechanism 5 is shifted by a driving force of a driving motor 7, such that the optical path of the optical system is opened and closed in response to the movement of the light control blades 6, 6. The driving motor 7 may be, for example, an inner-rotor-type motor, which has a stator containing a rotor inside. The driving force of the driving motor 7 is transmitted to the light control blades 6, 6 so as to shift the light control blades 6, 6.

A light beam from a photographic subject passes through the lens or the lens unit 3 and travels through an aperture formed by the pair of light control blades 6, 6 or a shutter member so as to enter the image-capturing unit 4. During the adjustment process for the amount of incident light, the light control blades 6, 6 are shifted in a translational manner within a plane extending perpendicular to an optical axis OL. Alternatively, in the present invention, the number and the shape of the light control blades, for example, are not limited to those defined above. For example, the present invention may include an alternative example in which a single light control blade or a plurality of light control blades is provided.

The structure of the image-capturing device will now be described in more detail with reference to FIGS. 2 to 11.

Figure 2:
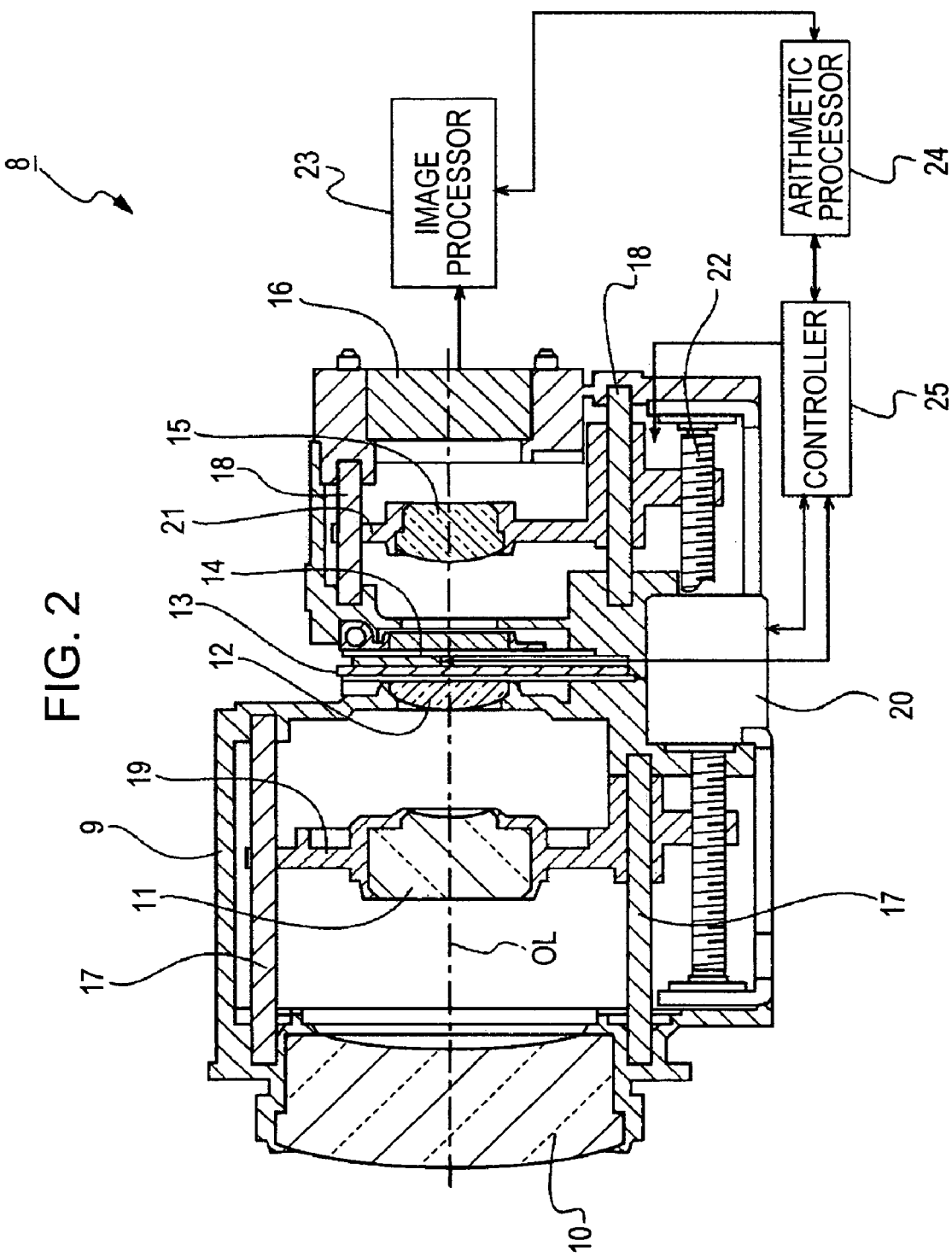
FIG. 2 is a cross-sectional view of the image-capturing device.

Referring to FIG. 2, a lens barrel 9 of an image-capturing device 8 includes an objective lens 10, a variable-power lens 11, a lens 12, a light adjustment mechanism 13, a driving motor 14, a focusing lens 15, and a solid-state image sensor 16 in that order from a photographic subject.

The lens barrel 9 contains therein guide bars 17, 17 and guide bars 18, 18, which extend parallel to the optical axis OL. The pair of guide bars 17, 17 and the pair of guide bars 18, 18 are disposed on opposite sides of the light adjustment mechanism 13 with respect to the direction of the optical axis OL.

The variable-power lens 11 is held by a holder 19, and the holder 19 is slidably supported by the guide bars 17, 17. A driving force of a variable-power-lens driving portion 20 is transmitted to the holder 19 so as to shift the variable-power lens 11 held by the holder 19 in the direction of the optical axis OL.

The focusing lens 15 is held by a holder 21, and the holder 21 is slidably supported by the guide bars 18, 18. A driving force of a focusing-lens driving portion 22 is transmitted to the holder 21 so as to shift the focusing lens 15 held by the holder 21 in the direction of the optical axis OL.

An image output obtained by the solid-state image sensor 16 is sent to an image processor 23, which is where a predetermined process is performed on the image output. The image processor 23 sends, for example, required control data to an arithmetic processor 24; sends a captured image to, for example, a viewfinder or a monitor so that the captured image is displayed on the viewfinder or the monitor; and records, for example, image data on a recording medium based on a command signal from a user. The arithmetic processor 24 provided with, for example, a microcomputer sends a control command signal to a controller 25. In response to receiving the control command signal, the controller 25 outputs control signals to, for example, the driving motor 14, the variable-power-lens driving portion 20, and the focusing-lens driving portion 22 in order to control the corresponding components.

Figure 3:
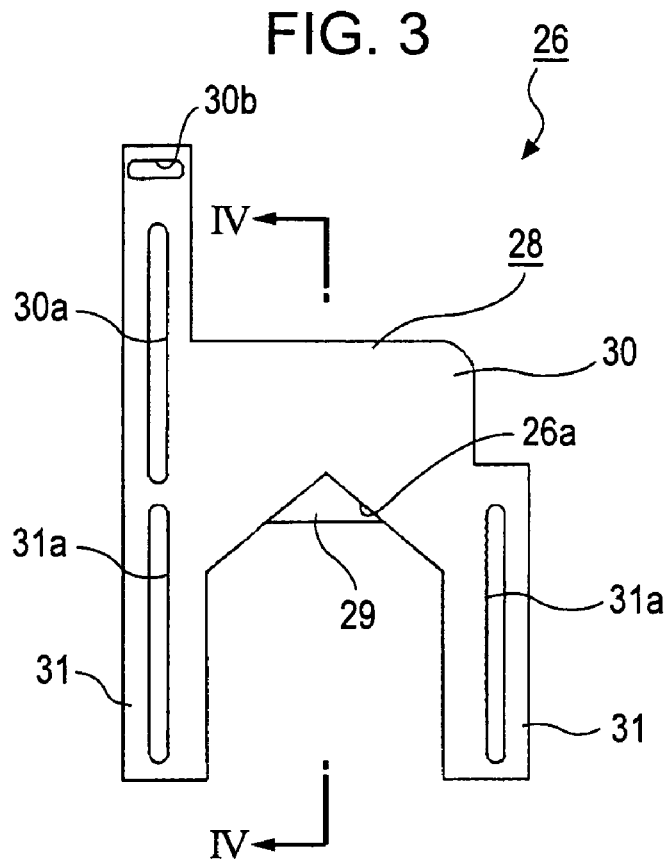
FIG. 3 is an enlarged front view of one of the light control blades.

Referring to FIG. 3, the light adjustment mechanism 13 includes a pair of light control blades 26, 27. In FIG. 3, only the light control blade 26 is shown. The amount of incident light is adjusted by shifting the light control blades 26, 27. The light adjustment mechanism 13 is built inside the lens barrel 9 without protruding outward from the outer periphery surface of the lens barrel 9. This prevents the light adjustment mechanism 13 from interfering with other peripheral components and also contributes to a size reduction and compactness of the overall structure.

The light control blade 26 integrally includes a light-blocking portion 28 defining a main body of the blade and a light adjustment filter 29 functioning as an ND (neutral density) filter.

The light-blocking portion 28 includes a main segment 30 and protruding segments 31, 31 protruding downward from left and right sides of the main segment 30. The lower portion of the light control blade 26 is provided with a cutout 26a.

One side of the main segment 30 is provided with a long guide hole 30a extending longitudinally in the vertical direction. An upper end portion of the main segment 30 is provided with a sliding hole 30b extending longitudinally in the horizontal direction.

The protruding segments 31, 31 are respectively provided with long guide holes 31a, 31a extending longitudinally in the vertical direction.

Figure 10:
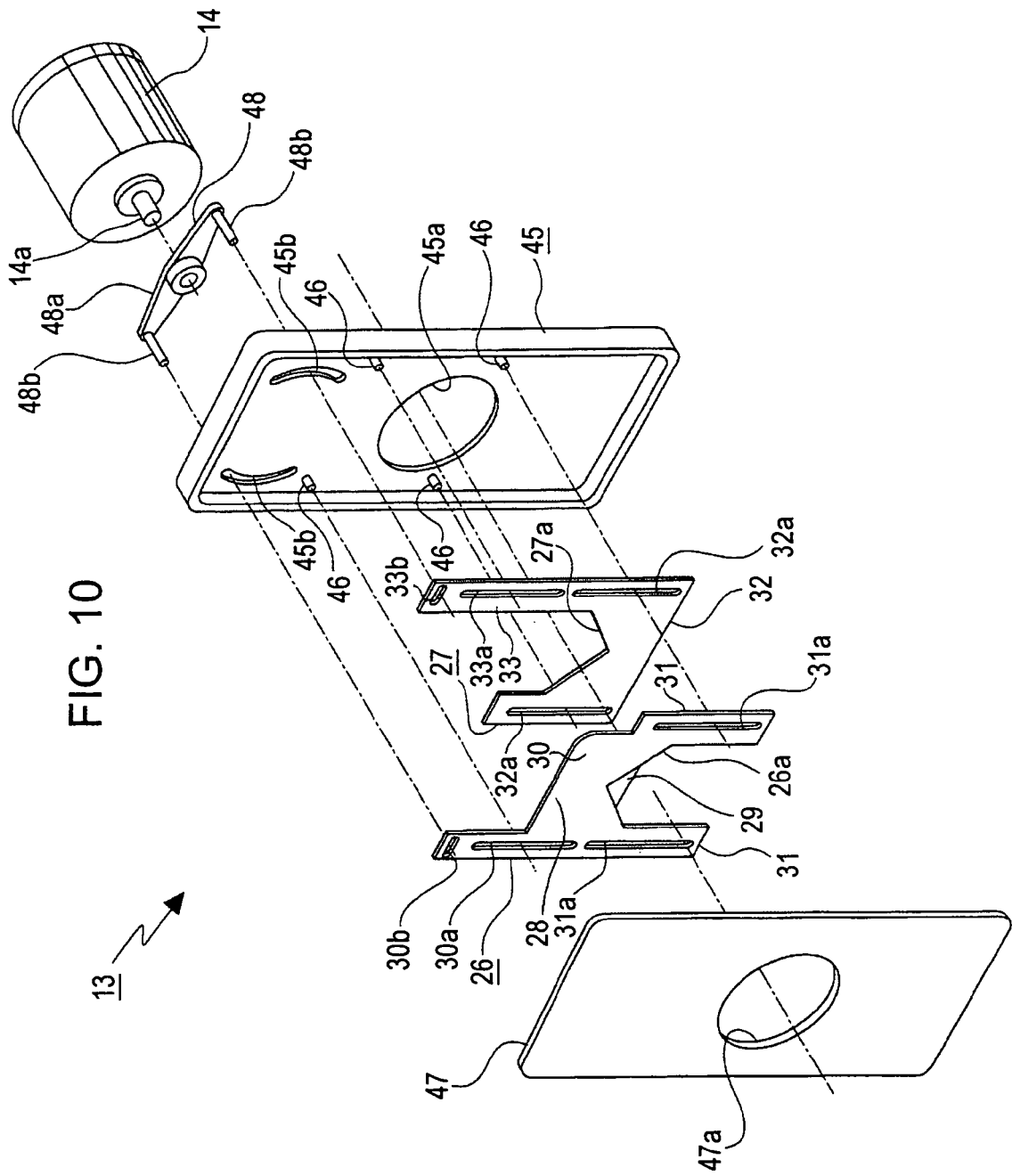
FIG. 10 is an exploded perspective view of a light adjustment mechanism.

On the other hand, the light control blade 27 includes only the main body of the blade having a main segment 32 and a protruding segment 33 extending upward from one side of the main segment 32 (see FIG. 10). The upper portion of the light control blade 27 is provided with a cutout 27a. The left and right sides of the main segment 32 are respectively provided with long guide holes 32a, 32a extending longitudinally in the vertical direction.

The protruding segment 33 is provided with a long guide hole 33a extending longitudinally in the vertical direction. An upper end portion of the protruding segment 33 is provided with a sliding hole 33b extending longitudinally in the horizontal direction.

The light adjustment filter 29 is disposed in the cutout 26a of the light control blade 26.

The layer configuration and the manufacturing method of the light control blade 26 will now be described with reference to FIGS. 4 to 9. Although the light adjustment filter 29 may be disposed in either one of the light control blade 26 and the light control blade 27, the description below is directed to an example in which the light adjustment filter 29 is provided in the light control blade 26.

Figure 4:
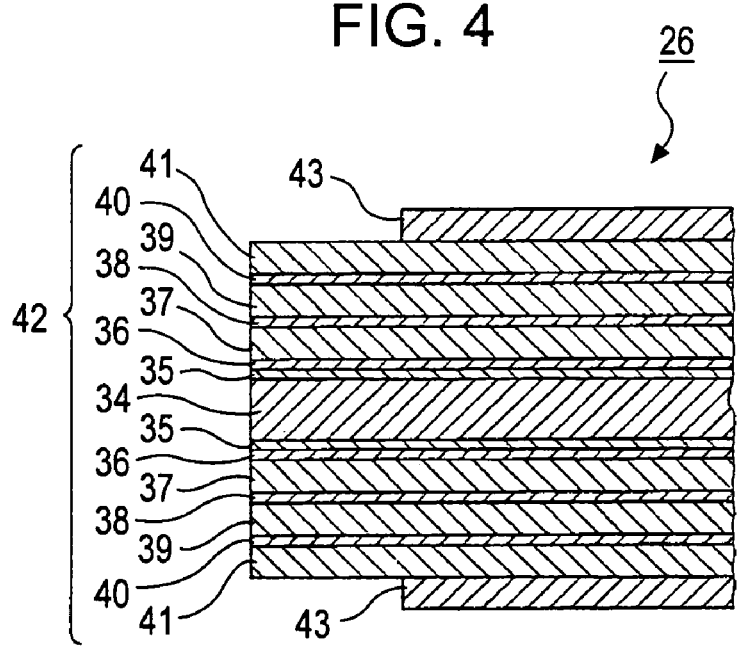
FIG. 4 is an enlarged cross-sectional view taken along line IV-IV in FIG. 3.

Referring to FIG. 4, the light adjustment filter 29 of the light control blade 26 includes a base material 34 functioning as a substrate and composed of a PET (polyethylene terephthalate) film. Opposite surfaces of the base material 34 are respectively provided with bonding layers 35, 35 composed of silicon monoxide or silicon dioxide; metallic layers 36, 36 composed of aluminum or aluminum alloy; dielectric layers 37, 37 composed of silicon dioxide; niobium layers 38, 38 composed of niobium; dielectric layers 39, 39 composed of silicon dioxide; niobium layers 40, 40 composed of niobium; and dielectric layers 41, 41 composed of silicon dioxide. The bonding layers 35, 35, the metallic layers 36, 36, the dielectric layers 37, 37, the niobium layers 38, 38, the dielectric layers 39, 39, the niobium layers 40, 40, and the dielectric layers 41, 41 are respectively stacked one on top of the other in that order on the opposite surfaces of the base material 34 so as to define a multilayer laminate 42.

The light-blocking portion 28 of the light control blade 26 is defined by light-blocking layers 43, 43 composed of carbon partially disposed above the opposite surfaces of the multilayer laminate 42.

Figure 5:
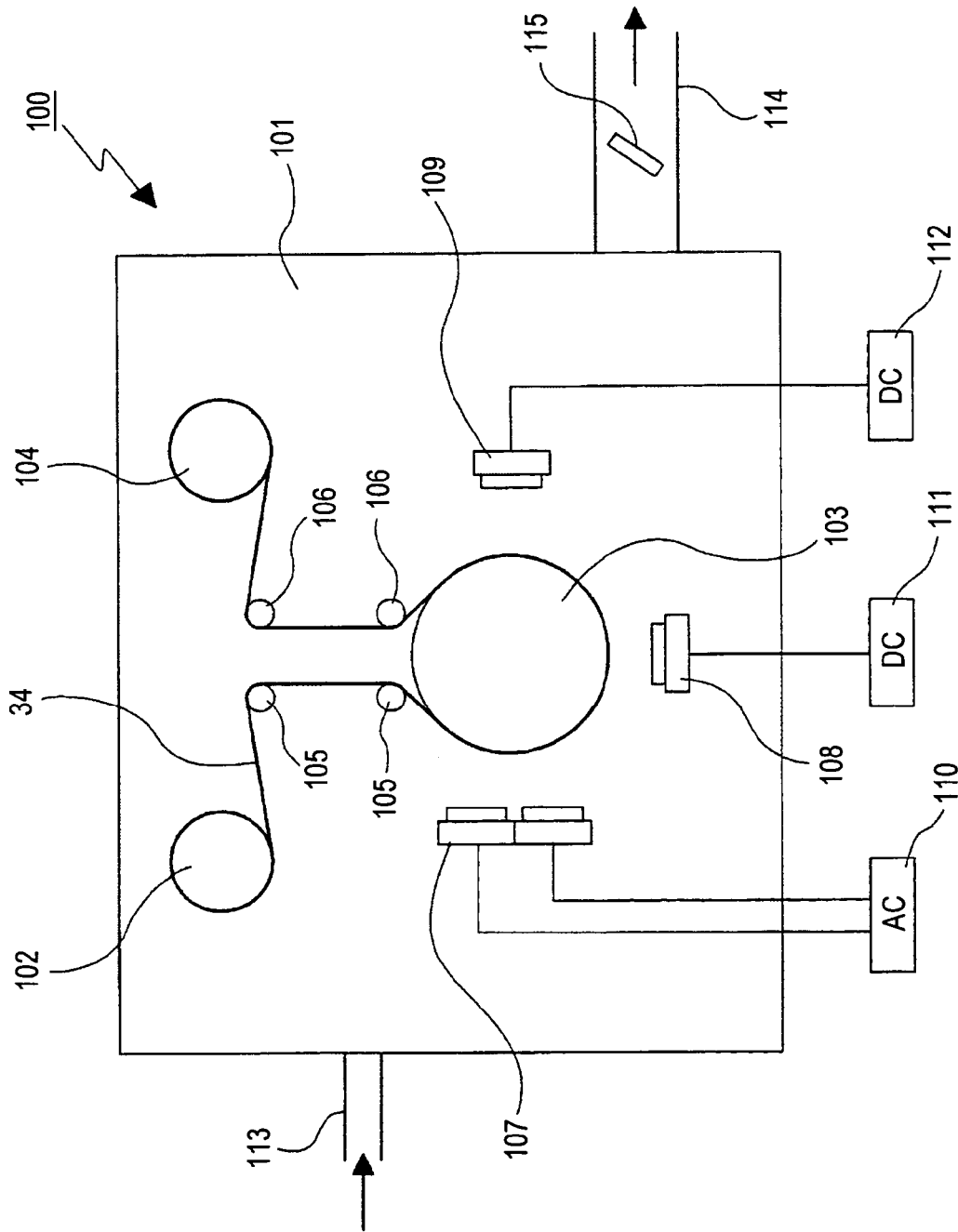
FIG. 5 is a schematic diagram of a continuous deposition device.

Referring to FIG. 5, a manufacturing method of the multilayer laminate 42 will be described. Specifically, the layers are deposited one on top of the other by, for example, sputtering using a continuous deposition device 100. The application of the sputtering technique contributes to formation of layers having high durability and high weather resistibility.

The continuous deposition device 100 includes a base 101 on which a base-material feeder 102, a cooling drum 103, and a base-material winder 104 are disposed. Guide rollers 105, 105 are supported in a rotatable manner between the base-material feeder 102 and the cooling drum 103. Moreover, guide rollers 106, 106 are supported in a rotatable manner between the cooling drum 103 and the base-material winder 104.

The base material 34 is formed into a long tape and is wound around the base-material feeder 102. The base material 34 extends through the guide rollers 105, 105 and is wrapped around the cooling drum 103 to form a loop. The base material 34 further extends through the guide rollers 106, 106 so as to be taken up by the base-material winder 104.

A dual cathode 107, a cathode 108, and a cathode 109 are arranged distant from one another around the cooling drum 103 at positions facing the base material 34 wrapped around the cooling drum 103. The dual cathode 107, the cathode 108, and the cathode 109 are respectively connected to an AC power source 110, a DC power source 111, and a DC power source 112.

The continuous deposition device 100 is connected to a gas inlet duct 113. Moreover, the continuous deposition device 100 is also connected to a gas outlet duct 114. A conductance valve 115 for adjusting the exhaust rate is provided inside the gas outlet duct 114. The gas outlet duct 114 is connected to a vacuum pump, which is not shown. The vacuum pump vacuums the gas inside the continuous deposition device 100 through the gas outlet duct 114 so as to allow the interior space of the continuous deposition device 100 to be in a vacuum state.

For example, in the continuous deposition device 100, silicon is set in the dual cathode 107, aluminum or aluminum alloy is set in the cathode 108, and niobium is set in the cathode 109. A predetermined gas is input to the continuous deposition device 100 through the gas inlet duct 113. Power is supplied to each of the power sources 110, 111, and 112, and moreover, the conveying rate of the guide rollers 105, 105 and the guide rollers 106, 106 is controlled. Thus, a deposition process using the sputtering technique is performed sequentially while the thickness of each layer formed on the base material 34 is adjusted. This deposition process is performed on both surfaces of the base material 34 in order to form the multilayer laminate 42.

Figure 6:
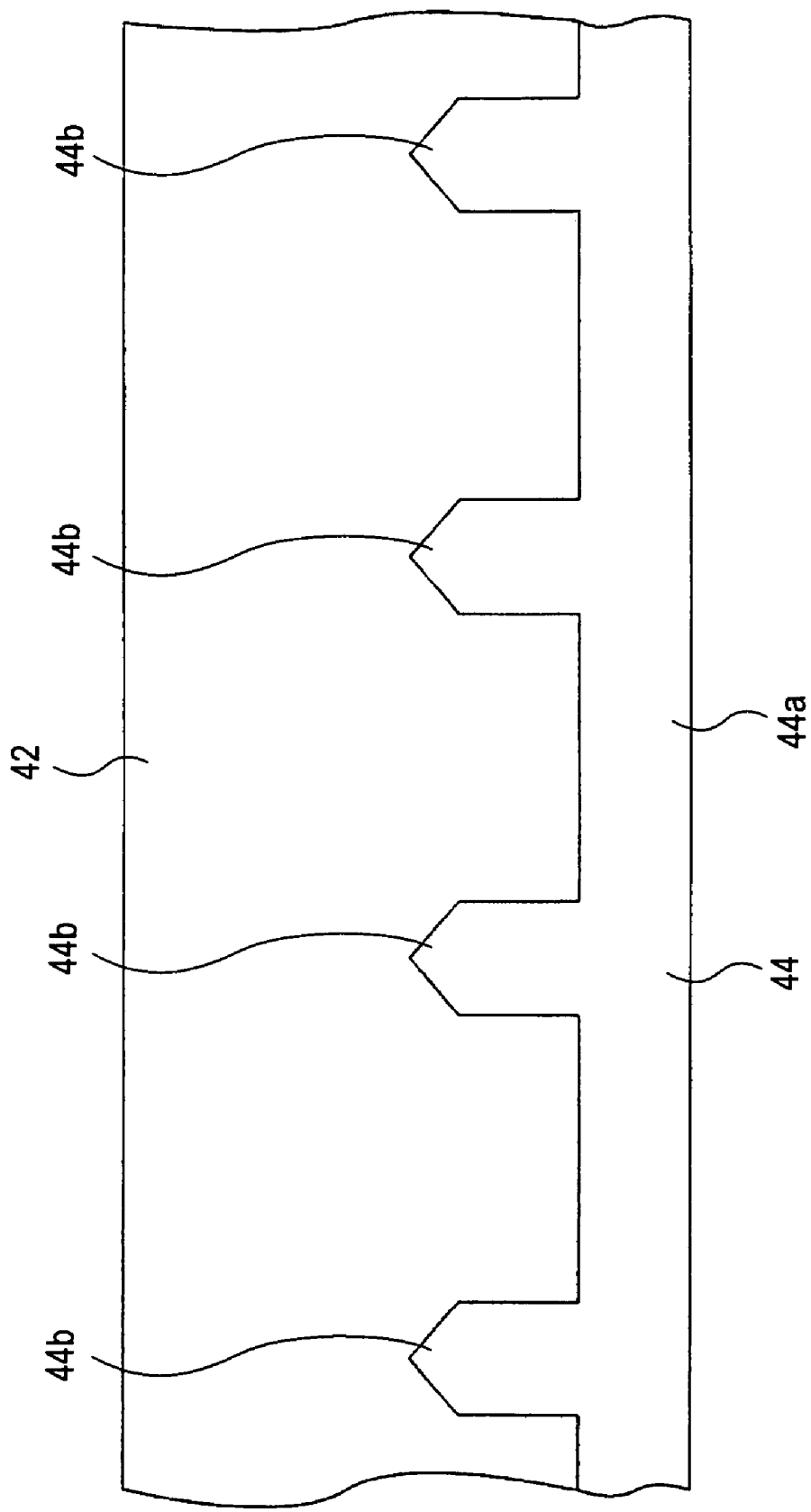
FIG. 6 is an enlarged plan view illustrating a state in which a masking film is disposed on a multilayer laminate.

Subsequently, referring to FIG. 6, masking films 44, 44 composed of, for example, PET are prepared. With respect to the thickness direction, each masking film 44 has one of its surfaces serving as an adhesive surface. Each masking film 44 includes a fixed-width segment 44a having a fixed width and a plurality of protruding segments 44b protruding in the same direction from the fixed-width segment 44a. The protruding segments 44b are, for example, tapered and are arranged at regular intervals in the longitudinal direction of the fixed-width segment 44a.

The masking films 44, 44 are respectively attached to the opposite surfaces of the multilayer laminate 42 by bonding, and each extend along one lateral side of the multilayer laminate 42.

Figure 7:
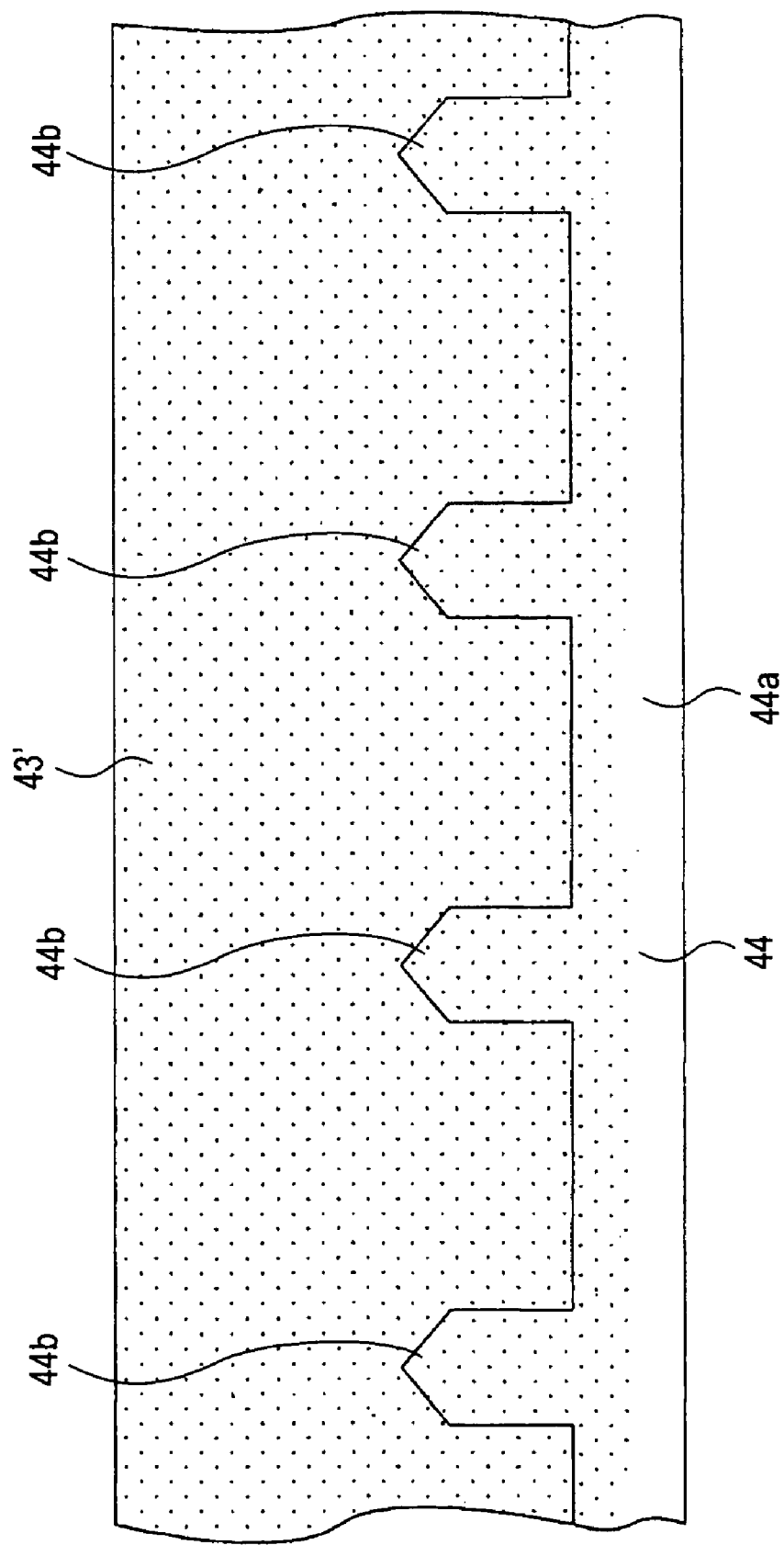
FIG. 7 is an enlarged plan view illustrating a state in which the multilayer laminate is coated with a coating layer.
Figure 8:
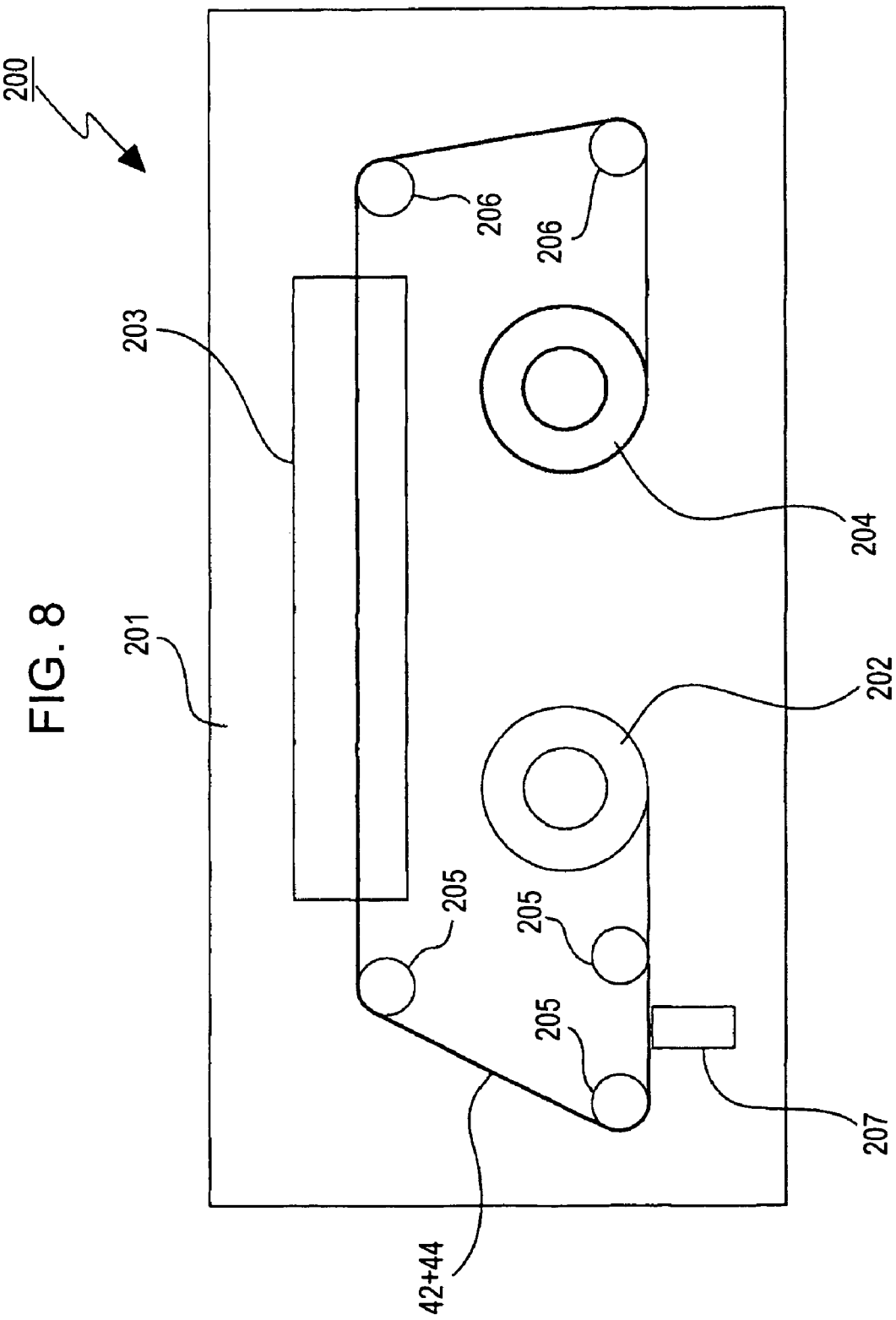
FIG. 8 is a schematic diagram of a coating device.

Referring to FIG. 7, a coating process is performed by employing a solution coating technique. This coating process is performed using a coating device 200 shown in FIG. 8.

The coating device 200 includes a base 201 on which a feeder 202, a drier 203, and a winder 204 are disposed. Guide rollers 205, 205, 205 are supported in a rotatable manner between the feeder 202 and the drier 203. Moreover, guide rollers 206, 206 are supported in a rotatable manner between the drier 203 and the winder 204. Two of the guide rollers 205, 205 have a coating head 207 disposed therebetween.

The coating process is performed on each of the two opposite surfaces of the multilayer laminate 42. The multilayer laminate 42 wound around the feeder 202 is fed from the feeder 202 and passes through the guide rollers 205, 205, 205 and the guide rollers 206, 206 so as to be taken up by the winder 204.

In this conveying process, the coating head 207 applies a coating solution mainly to a portion of the multilayer laminate 42 where the masking film 44 is not disposed. The coating solution may be, for example, an acrylic solution containing carbon. The multilayer laminate 42 coated with the coating solution is dried in the drier 203 so that the acrylic component is vaporized. Thus, a carbon layer 43' is formed on the portion of the multilayer laminate 42 where the masking film 44 is not disposed.

Figure 9:
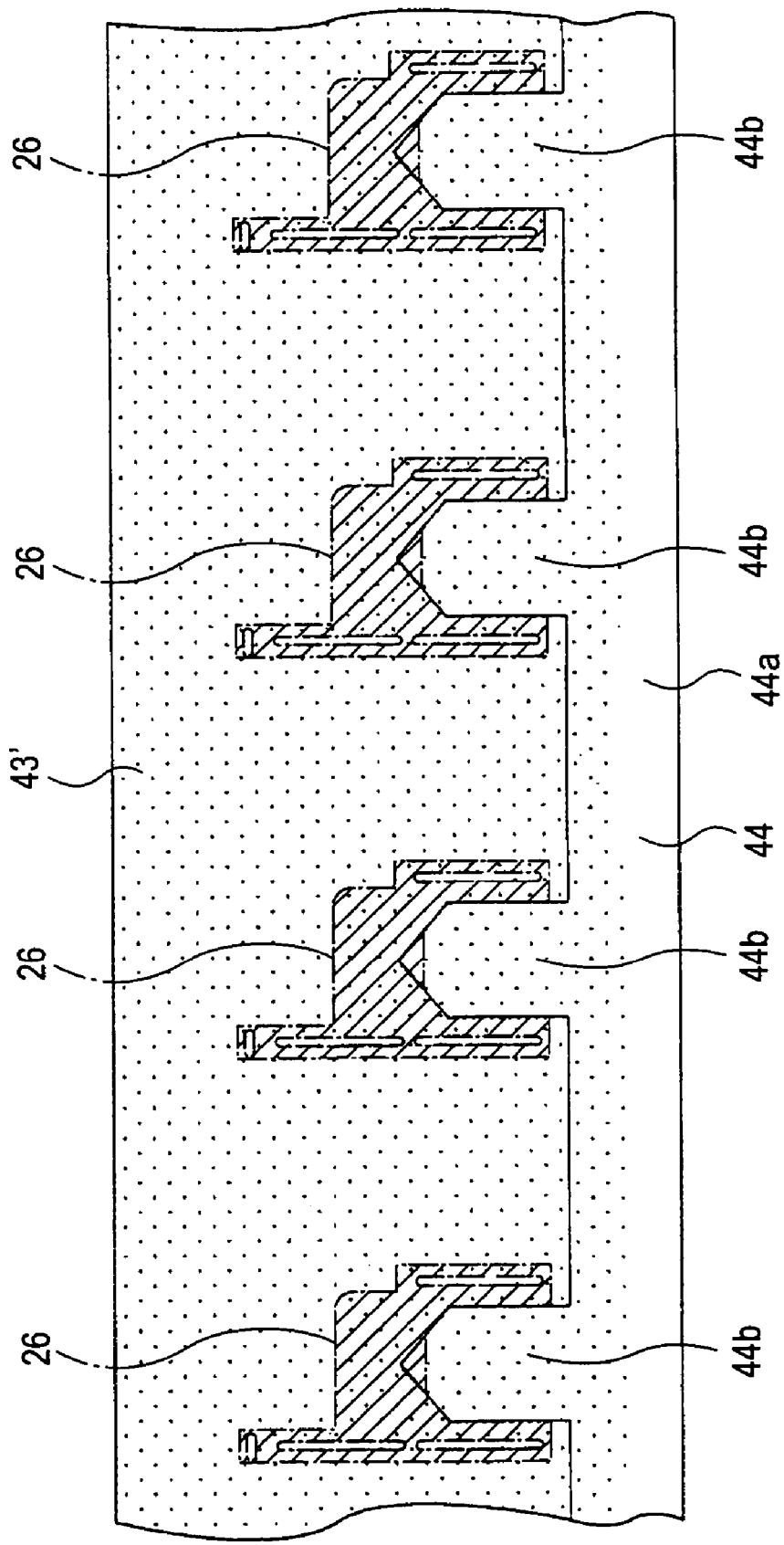
FIG. 9 is an enlarged plan view illustrating the sections to be cut out by press molding.

The carbon layer 43' is formed on each of the two opposite surfaces of the multilayer laminate 42. Subsequently, the shaded sections shown in FIG. 9 are punched out by press molding, and the masking films 44, 44 are peeled off from the multilayer laminate 42, thereby forming a plurality of the light control blades 26. In each light control blade 26 formed, the section provided with the carbon layers 43' functions as the light-blocking portion 28, whereas the section not provided with the carbon layers 43' functions as the light adjustment filter 29. The punching process is also performed simultaneously for sections where the guide hole 30a, the sliding hole 30b, and the guide holes 31a, 31a are to be formed.

Figure 11:
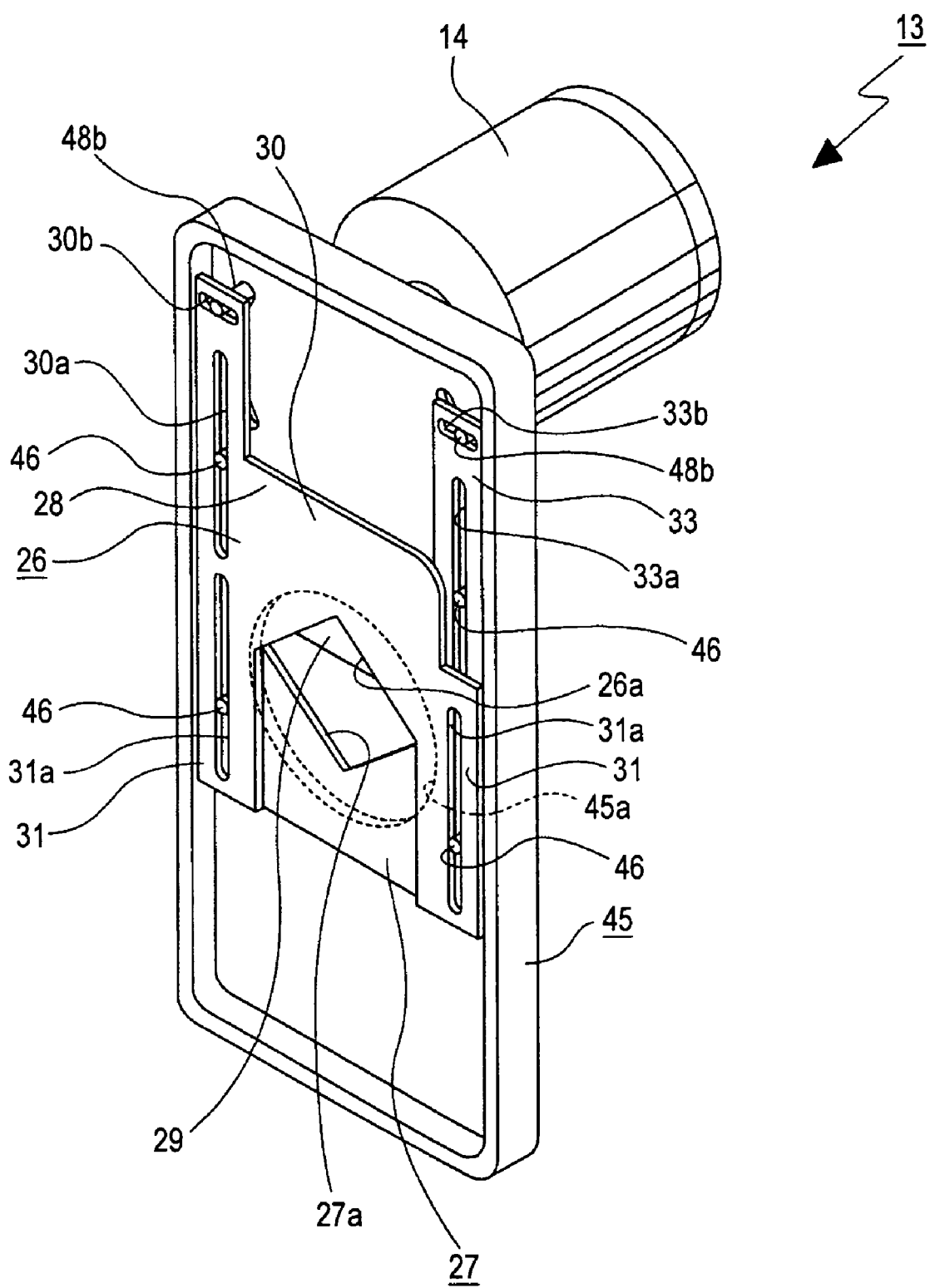
FIG. 11 is an enlarged perspective view of the light adjustment mechanism.

Referring to FIGS. 10 and 11, the light control blades 26, 27 are supported by a base body 45 in a movable manner in the vertical direction.

The base body 45 has a substantially rectangular shape that extends longitudinally in the vertical direction. A substantially central portion of the base body 45 is provided with a transmission hole 45a through which the optical path of the optical image-capturing system extends. Specifically, the optical axis OL of the optical path extends through the center of the transmission hole 45a. The base body 45 is also provided with circular-arc through holes 45b, 45b.

Moreover, the base body 45 has four guide pins 46 that protrude in the forward direction.

A first set of three of the guide pins 46 of the base body 45 is slidably engaged with the guide holes 30a, 31a, and 31a of the light control blade 26, respectively. Furthermore, a second set of three of the guide pins 46 of the base body 45 is slidably engaged with the guide holes 32a, 32a, and 33a of the light control blade 27, respectively. In other words, two of the guide pins 46 are engaged with the guide holes 31a, 31a of the light control blade 26 and the guide holes 32a, 32a of the light control blade 27. On the other hand, the remaining one of the two guide pins 46 is engaged with only the guide hole 30a of the light control blade 26, and the one remaining guide pin 46 is engaged with only the guide hole 33a of the light control blade 27.

Referring to FIGS. 10 and 11, in a state where the light control blades 26, 27 are supported by the base body 45, a cover body 47 for covering the light control blades 26, 27 is mounted to the base body 45. The cover body 47 has a substantially-rectangular shape that extends longitudinally in the vertical direction. The central portion of the cover body 47 is provided with a large opening 47a. In a state where the cover body 47 is mounted to the base body 45, the center of the opening 47a of the cover body 47 is aligned with the center of the transmission hole 45a of the base body 45 in the direction of the optical axis OL.

As shown in FIGS. 10 and 11, the driving motor 14 is disposed posterior to the base body 45. The driving motor 14 is disposed in a manner such that a motor shaft 14a extends in the front-back direction. The motor shaft 14a of the driving motor 14 has a rotatable arm 48 fixed thereto.

The rotatable arm 48 includes an arm segment 48a and engagement pins 48b, 48b provided respectively on opposite ends of the arm segment 48a. A central portion of the arm segment 48a with respect to its longitudinal direction is fixed to the motor shaft 14a. The arm segment 48a extends longitudinally in a direction perpendicular to the axial direction of the motor shaft 14a. The engagement pins 48b, 48b protrude forward from the arm segment 48a.

In a state where the driving motor 14 is disposed posterior to the base body 45, the engagement pins 48b, 48b of the rotatable arm 48 respectively extend through the through holes 45b, 45b of the base body 45 so as to slidably engage with the sliding holes 30b and 33b of the light control blades 26, 27.

Figure 12:
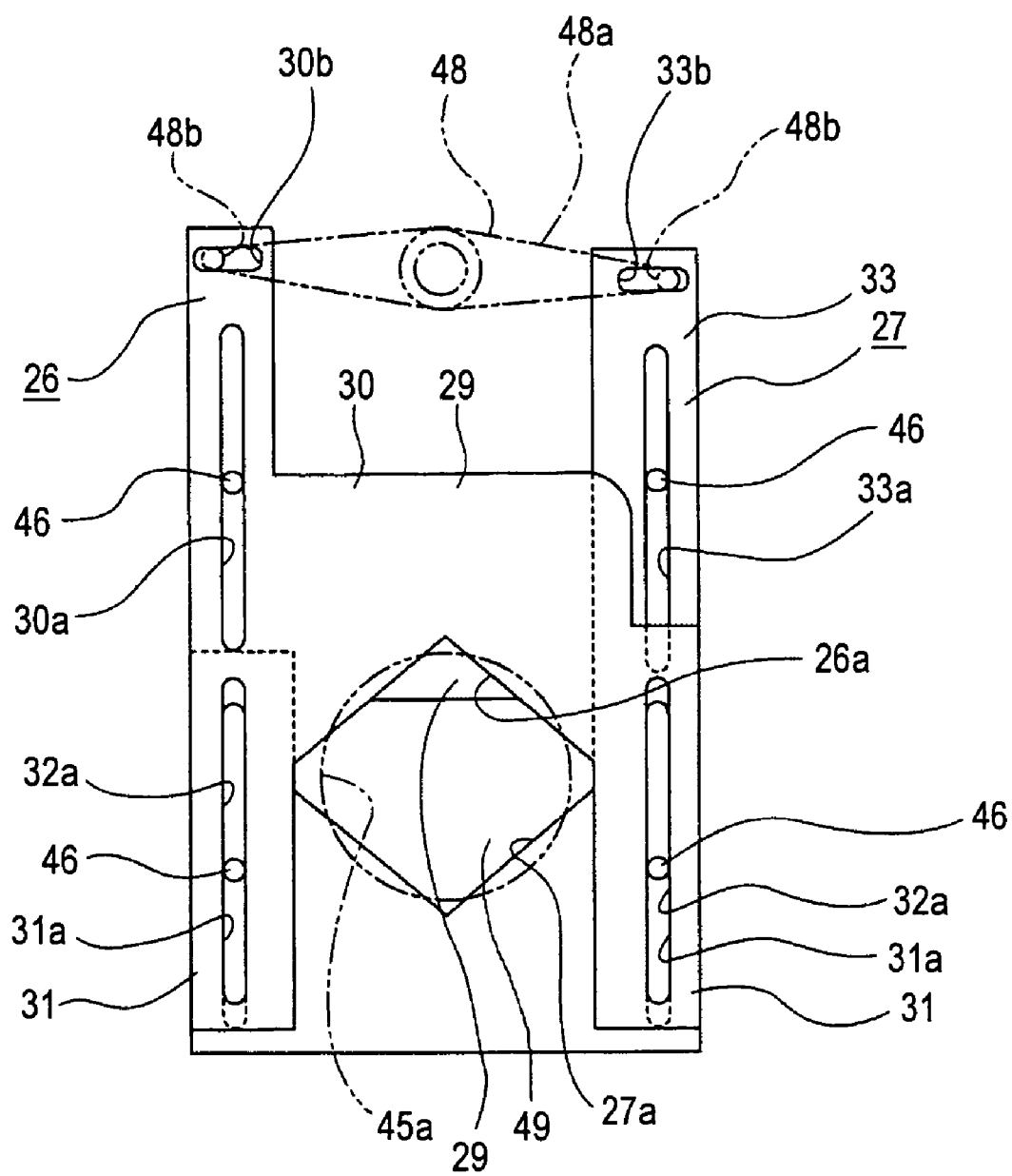
FIG. 12 illustrates the operation of the light control blades and is an enlarged front view showing a state in which a transmission hole is opened.
Figure 13:
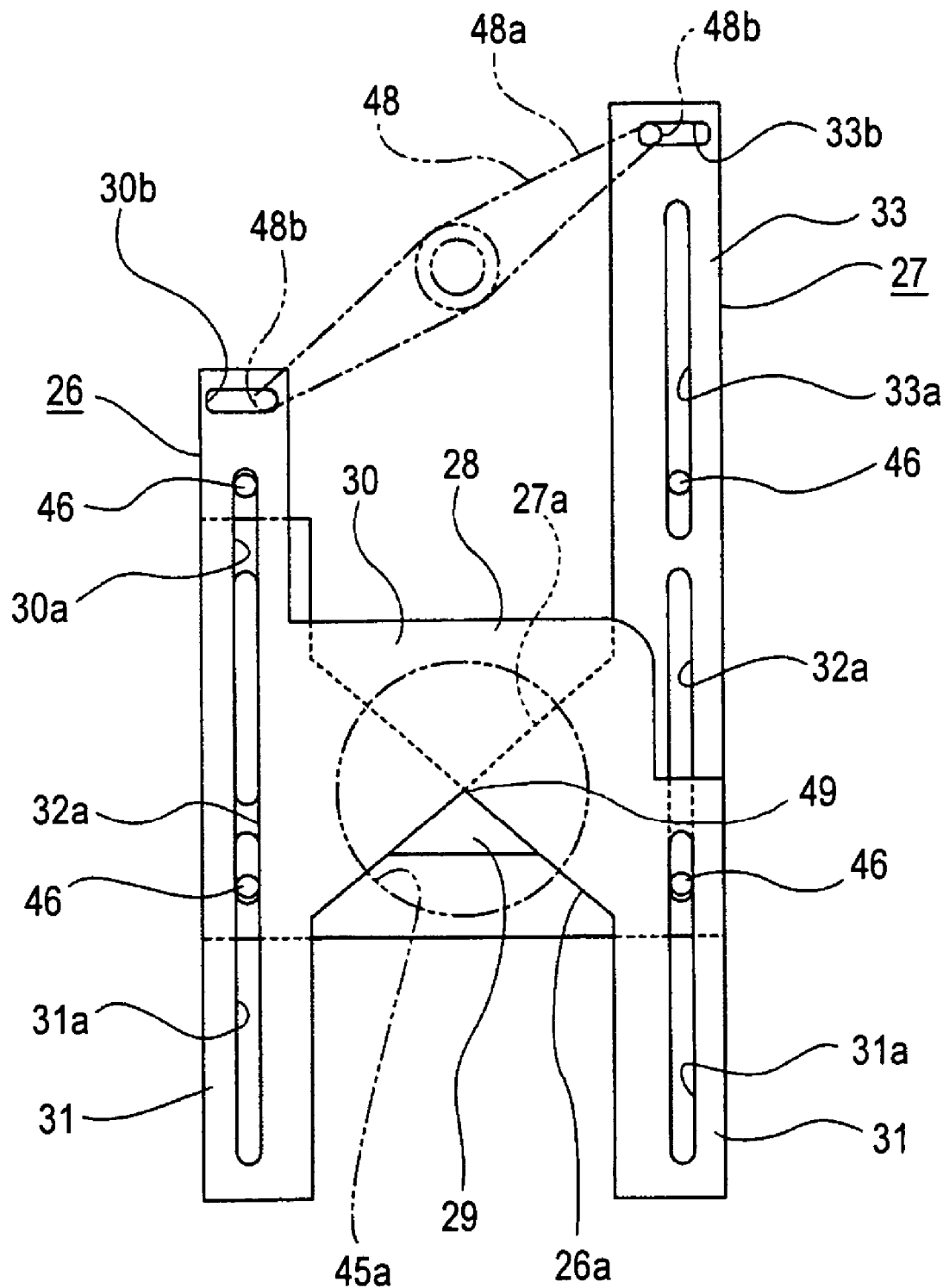
FIG. 13 also illustrates the operation of the light control blades and is an enlarged front view showing a state in which the transmission hole is closed.

The operation of the light control blades 26, 27 performed in response to the rotation of the driving motor 14 will be described below with reference to FIGS. 12 and 13. In FIGS. 12 and 13, the light adjustment filter 29 is not shown.

Due to the fact that the engagement pins 48b, 48b of the rotatable arm 48 are respectively engaged with the sliding holes 30b and 33b of the light control blades 26, 27, when the rotatable arm 48 is rotated in response to the rotation of the driving motor 14, the light control blades 26, 27 are shifted towards or away from each other vertically in a translational manner while being guided by the guide pins 46.

In this case, as shown in FIG. 12, when the driving motor 14 is rotated in one direction, the light control blades 26, 27 are shifted away from each other. Thus, the dimension of an aperture 49 formed between the cutouts 26a and 27a of the light control blades 26, 27 is increased, thereby opening the transmission hole 45a. As a result, the amount of incident light increases. In contrast, as shown in FIG. 13, when the driving motor 14 is rotated in the other direction, the light control blades 26, 27 are shifted towards each other. Thus, the dimension of the aperture 49 formed between the cutouts 26a and 27a of the light control blades 26, 27 is decreased, thereby closing the transmission hole 45a. As a result, the amount of incident light decreases.

Accordingly, the amount of light passing through the transmission hole 45a of the base body 45 is adjusted based on the dimension of the aperture 49, which is controlled using the light control blades 26, 27.

Furthermore, when the light control blades 26, 27 are being shifted as described above, the transmission hole 45a of the base body 45 is also opened or closed by the light adjustment filter 29 in response to the movement of the light control blades 26, 27. Consequently, in addition to the adjustment by the light-blocking portion 28 of the light control blade 26 and the light control blade 27, the amount of light is also adjusted through the light adjustment filter 29.

Accordingly, in the image-capturing device 1, since the light-blocking portion 28 and the light adjustment filter 29 are integrally included in the light control blade 26, the image-capturing device 1 is given a lesser number of components and does not require a process for attaching the light adjustment filter 29 to the light-blocking portion 28. Consequently, this contributes to a lesser number of steps in the manufacturing process and also achieves lower manufacturing costs.

In the above-described embodiment, the opposite surfaces of the base material 34 are coated with layers in order to form the light control blade 26. In this case, the light adjustment filter 29 does not necessarily have to be formed by stacking layers on the opposite surfaces of the base material 34, and it may alternatively be formed by stacking layers on only one of the opposite surfaces of the base material 34.

The technical scope of the present invention is not limited to the above embodiments, and modifications are permissible within the scope and spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A light control blade which opens and closes an optical path of an optical image-capturing system so as to control the amount of light entering the optical image-capturing system, light control blade comprising: a multilayer laminate including a base material which is composed of a film and serves as a substrate, at least a niobium layer, at least a metallic layer disposed on the base material, and at least a dielectric layer disposed on the base material.

2. The light control blade of claim 1 further including a plurality of guide pins engaging a plurality of guide slots in said light control blade to guide said light control blade when laterally moved by rotation of said motor.

3. The light control blade of claim 1, further including means for translating rotary motion of a motor into translational motion of said light control blade to cause control of said light in said optical path.

4. The light control blade of claim 1, wherein the light-blocking layer and the light adjustment filter are integral with said light control blade.

5. The light control blade of claim 1, further in combination with a second light control blade arranged in register with the light control blade in such a manner that when the motor is rotated in one direction, both light control blades are shifted away from each other and when the motor is rotated in the other direction, both light control blades are shifted toward one another.

6. A method for manufacturing a light control blade comprising the steps of:
forming layers on opposite surfaces of a base material composed of a tape-like film so as to form a workpiece, wherein the base material is composed of a film and serves as a substrate, the layers including at least a niobium layer, at least a metallic layer disposed on the base material, and at least a dielectric layer disposed on the base material.

7. The method of claim 6, wherein said light control blade further includes an engagement pin connected to an arm of said light control blade extends through a circular-arc through hole such that when said motors rotates said rotatable arm, said light control blade moves to control light in said optical path.

8. The method as set forth in claim 7 wherein said light control blade further includes a plurality of guide pins engaging a plurality of guide slots in said light control blade to guide said light control blade when laterally moved by rotation of said motor.

9. The method as set forth in claim 6, further comprising a step of translating rotary motion of a motor into translational motion of said light control blade to cause control of said light in said optical path.

10. In combination, a first and a second light control blade arranged for relative translation responsive to motor rotation to open or close a light path, each comprising: a multilayer laminate including a base material which is composed of a film and serves as a substrate, at least a niobium layer, at least a metallic layer disposed on the base material, and at least a dielectric layer disposed on the base material.

11. The combination of claim 10 wherein each of said light control blades further includes a plurality of guide pins respectively engaging a plurality of guide slots in each of said light control blades to guide said light control blade when laterally moved by rotation of said motor.

12. The combination of claim 10 wherein each of said light control blades further includes means for translating rotary motion of a motor into relative translational motions of said light control blades to cause control of said light in said optical path.

13. The combination of claim 10 wherein, in each of said light control blades, the light-blocking layer and the light adjustment filter are respectively integral with each of said light control blades.

14. The combination of claim 10 wherein the light control blades are arranged in register in such a manner that when the motor is rotated in one direction, both light control blades are shifted away from each other and when the motor is rotated in the other direction, both light control blades are shifted toward one another.

* * * * *